United States Patent Office 3,536,901
Patented Oct. 27, 1970

3,536,901
NAVIGATIONAL COMPUTING APPARATUS
Michael Geoffrey Pearson, London, England, assignor to Decca Limited, London, England, a British company
Continuation-in-part of application Ser. No. 68,898, Nov. 14, 1960. This application Dec. 15, 1966, Ser. No. 601,893
Claims priority, application Great Britain, Nov. 16, 1959, 38,818/59
Int. Cl. G06f 15/50; G06g 7/78
U.S. Cl. 235—150.272          7 Claims

ABSTRACT OF THE DISCLOSURE

This invention relates to navigational computing apparatus for use with a hyperbolic navigation system of the kind having a common master station with two or more slave stations. The computing apparatus disclosed in this application serves to convert the hyperbolic co-ordinates representing the position of a craft into Cartesian co-ordinates and makes use of a technique in which the Cartesian co-ordinates are expressed as linear functions $Ah+B$ and $Ch+D$ of $h$, the distance of the craft from the master station, A, B, C, and D being functions of the hyperbolic co-ordinates and of the locations of the slave stations with respect to the master. The distance $h$ is determined by solving a quadratic equation $$Jh^2 + 2Kh + L = 0$$

where J, K and L are functions of A, B, C and D.

---

This application is a continuation-in-part of my co-pending application Ser. No. 68,898 filed Nov. 14, 1960, for Navigational Computing Apparatus now abandoned.

This invention relates to navigational computing apparatus for use with a hyperbolic navigation system of the kind having a common master station with two or more slave stations and for converting information representative of the position of the craft with respect to two or more sets of confocal hyperbolae into Cartesian or polar co-ordinates. Hyperbolic navigation systems are widely used for many reasons but it is not possible to correlate information from such systems with other navigational position information except by plotting on a chart or by converting co-ordinates, e.g. by converting the hyperbolic system information into Cartesian co-ordinates. Particularly in high speed aircraft, it is desirable that the information should be converted very rapidly and automatically and the present invention is directed to this problem.

There are a number of ways in which information from a hyperbolic navigational system may be converted into Cartesian or polar co-ordinates. The information from the navigation system will be referred to hereinafter as information in hyperbolic co-ordinates since it defines the position of the craft with respect to two or more sets of confocal hyperbolae. These hyperbolic co-ordinates may be expressed numerically in a number of ways, for example, each of two co-ordinates might be the difference of the distances from the craft to the master and the appropriate slave station or each might be defined in terms of the angular directions of the asymptotes to the particular hyperbolae or by any other numerical value defining the appropriate hyperbolae. It is possible to solve the problem of conversion from hyperbolic to Cartesian or polar co-ordinates, for example, by mathematical analogue methods either by setting up a system of differential equations or by conformal mapping by means of affine transformations. These mathematical analogue methods, however, are complex mathematically and do not enable a simple computing device to be employed. It will be appreciated that this problem of rapid conversion of the hyperbolic co-ordinates into Cartesian or polar co-ordinates and possibly the subsequent use of this information for navigational computations in computing apparatus arises particularly in aircraft and, for use in aircraft, it is particularly desirable that the computing apparatus should be kept as small as possible and, in order to give the greatest reliability, should be as simple as possible. It is well known that it is easier to convert from Cartesian or polar into hyperbolic co-ordinates than from hyperbolic into Cartesian or polar co-ordinates and for that reason iterative methods of solution of the problem have been proposed in the past in which an assumed position of the craft in the desired co-ordinates is converted into the hyperbolic co-ordinates, this assumed position in hyperbolic co-ordinates then being compared with the actual hyperbolic co-ordinates and a correction introduced into the assumed position. The operation is then repeated until the correction becomes negligible. Such iterative methods, however, tend to take an appreciable time for calculation and they require initially knowledge of the approximate position of the craft which knowledge may not be available, for example, when an aircraft is first flying into the coverage region of a hyperbolic navigation system. The present invention employs a more direct method of calculation.

According to this invention, navigational computing apparatus for use with a hyperbolic navigation system of the kind having a common master station with two or more slave stations and for converting information representative of the position of a craft with respect to two or more sets of confocal hyperbolae into information in Cartesian or polar co-ordinates comprises computing means arranged to compute the Cartesian co-ordinates $x$ any $y$ of the position of the craft as linear function of $h_0$, the distance of the craft from the master station, in terms of hyperbolic co-ordinates and of data about the position of the stations of the navigation system, and then to solve these equations to determine the Cartesian or polar co-ordinates making use of the inherent relationship between the polar co-ordinates ($h_0\theta$) and the Cartesian co-ordinates ($xy$) of the position of the craft. Using rectangular Cartesian co-ordinates, the relation between polar and Cartesian co-ordinates may be expressed as $x^2+y^2=h_0^2$ and thus the two linear equations in $h_0$ representative of $x$ and $y$ may be combined by means of this relationship to give a quadratic in $h_0$ which can readily be solved by an operation involving the extraction of only one square root apart from operations of addition, subtraction, multiplication and division.

Once the value of $h_0$ has been determined, if the information is required in Cartesian co-ordinates, the values of $x$ and $y$ may readily be obtained by substituting this determined value of $h_0$ in the linear function of $h_0$ representing $x$ and $y$. If the information is required in polar co-ordinates the determined value of $h_0$ gives one of the co-ordinate values and the value of $\theta$ may readily be determined knowing that tan $\Theta$ is equal to the ratio of the values of $x$ and $y$ which may be obtained from substituting the values of $h_0$ in the aforementioned linear functions or, if preferred (since tan $\theta$ goes to infinity) that $$\sin \theta = \frac{y}{(x^2+y^2)^{1/2}} \text{ or } \cos \theta = \frac{x}{(x^2+y^2)^{1/2}}$$

The computing apparatus as indicated above would normally be carried on a craft and means would be provided for automatically feeding information representative of said hyperbolic co-ordinates from a radio navigational receiver into said computing means. Thus the required output information may be obtained wholly automatically.

Considering the use of rectangular Cartesian co-ordinates, the aforementioned computing means may be arranged as will be more fully explained later, to determine the values of $$x = Ah_0 + B$$

and $$y = Ch_0 + D$$

where $$A = \frac{P_1 Y_2 - P_2 Y_1}{X_1 Y_2 - X_2 Y_1}$$

$$B = \frac{a_1^2 Y_2 - a_2^2 Y_1}{2(X_1 Y_2 - X_2 Y_1)} - \frac{P_1^2 Y_2 - P_2^2 Y_1}{2(X_1 Y_2 - X_2 Y_1)}$$

$$C = \frac{P_2 X_1 - P_1 X_2}{X_1 Y_2 - X_2 Y_1}$$

$$D = \frac{a_2^2 X_1 - a_1^2 X_2}{2(X_1 Y_2 - X_2 Y_1)} - \frac{P_2^2 X_1 - P_1^2 X_2}{2(X_1 Y_2 - X_2 Y_1)}$$

$P_1$ and $P_2$ being the hyperbolic co-ordinates expressed as differences of distances from the craft to the master and the respective slave stations, $(X_1 Y_1)$ and $(X_2 Y_2)$ being the co-ordinates of the slave stations in the rectangular co-ordinate system having the master station at the origin and $a_1$ and $a_2$ being the base line lengths from the master station to the points $(X_1 Y_1)$ and $(X_2 Y_2)$ respectively. If the desired rectangular co-ordinate system has an origin remote from the master station, the required co-ordinates can be obtained from the values of $x$ and $y$ by simple addition.

It will be seen that the values of A, B, C and D are simple functions of $P_1$ $P_2$ $P_1^2$ and $P_2^2$. The values of $P_1$ $P_2$ $P_1^2$ and $P_2^2$ are multiplied by constants dependent only on the positions of the stations in the navigation system, which constants may be pre-set or stored in the computing means. It will be noted that only six constants have to be stored for this purpose and the only operations required are addition (or subtraction) and multiplication.

From the expressions $$x = Ah_0 + B$$

and $$y = Ch_0 + D$$

since $x^2 + y^2 = h_0^2$, then a quadratic equation in $h_0$ may be obtained giving the solution $$h_0 = \frac{-(AB + CD) \pm [B^2 + D^2 - (AD - BC)^2]^{1/2}}{A^2 + C^2 - 1}$$

This further computation, apart from the one square root, consists of operations of addition, subtraction, multiplication and division. In general the calculated values of the roots of the quadratic equation will give one positive and one negative value, the positive value being the value required. The exception is where two hyperpolae have two real points of intersection so that the determined position is ambiguous; the ambiguity has to be resolved by further positional information, for example, by using a third slave station or by storing the previous value of $h_0$ in a register and choosing the calculated value nearest the stored value.

Figure 4:
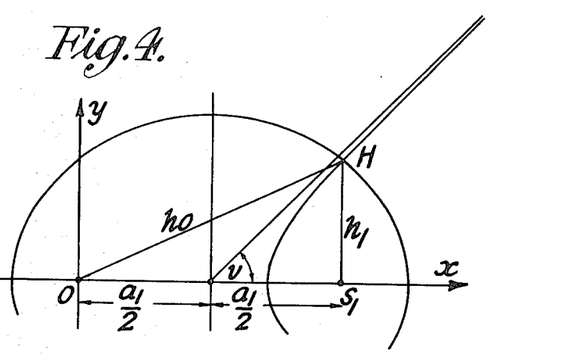
FIGS. 4 and 5 are diagrams previously mentioned for explaining the derivation of mathematical equations.

The derivation of the above expressions for $x$ and $y$ may be explained as follows: Consider firstly a system of Cartesian co-ordinates with the master station at the origin and the $x$ axis passing through the slave station which is at a distance $a_1$ from the master. In FIG. 4 of the accompanying drawings, a rectangular Cartesian co-ordinate system is illustrated with the master station at the origin O and the slave station at $S_1$ on the $x$ axis. H is any point and there is shown part of the hyperbolic position line passing through H. A linear relationship exists between the $x$ co-ordinate of any point H and the distance from the master station in a system of orthogonal elliptical co-ordinates with the stations at the foci. If the distance from the master station is $h_0$ and from the slave station is $h_1$, then the value $P_1$ previously defined is $h_0 - h_1$.

Defining $Q_1$ as $Q_1 = h_0 + h_1 = 2h_0 - P_1$ and noting that the parametric equations of the elliptical co-ordinate system are $$2x - a_1 = a_1 \cosh u \cos v$$

and $$2y = a_1 \sinh u \sin v$$

where the curves $v =$ constant are hyperbolae and the curves $u =$ constant are ellipses, then we have:

$$\cos v = \frac{P_1}{a_1}$$

$$\cosh u = \frac{Q_1}{a_1} = \frac{2h_0 - P_1}{a_1}$$

hence by substituting into the parametric equation for $x$ above, $$x = \frac{a_1}{2} + \frac{2h_0 P_1 - P_1^2}{2a_1}$$

which can be written as $$x = \frac{P_1}{a_1} h_0 + \frac{a_1}{2} - \frac{P_1^2}{2a_1}$$

Figure 5:
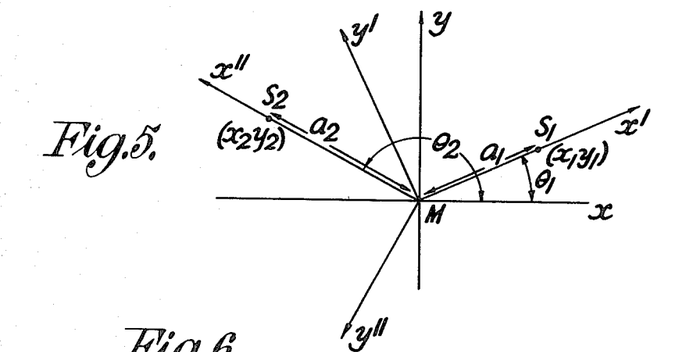

If this is substituted into the equation for $y$, an expression involving a square root is obtained. However by considering another slave, $y$ can be expressed linearly in terms of $h_0$ as follows:

Take the master as the origin and let $(xy)$ be the co-ordinate system in which the answer is required. Let the co-ordinates of the slave stations be $(X_1 X_1)$ and $(Y_2 Y_2)$ as shown in FIG. 5 and let the base line lengths from the master stations to these two slaves respectively be $a_1$ and $a_2$.

Now let $(x^1 y^1)$ be a co-ordinate systems with the master at the origin and $S_1$ on the positive side of the $x^1$ axis. For this case, as we have shown, $$x^1 = \frac{P_1}{a_1} h_0 + \frac{a_1}{2} - \frac{P_1^2}{2a_1}$$

therefore $\quad x^1 = A_1 h_0 + B_1$

Similarly $\quad x^{11} = A_2 h_0 + B_2$ where $$A_2 = \frac{P_2}{a_2}$$

and $$B_2 = \frac{a_2}{2} - \frac{P_2^2}{2a_2}$$

We also have the following relationships between $(xy)$ and $(x^1 y^1)$.

$$x^1 = x \cos \theta_1 + y \sin \theta_1$$

and $$y^1 = x \sin \theta_1 + y \cos \theta_1$$

where $$\cos \theta_1 = \frac{X_1}{a_1}$$

$$\sin \theta_1 = \frac{Y_1}{a_1}$$

Therefore $\quad x_1 = \frac{X_1}{a_1} x + \frac{Y_1}{a_1} y$

The corresponding equation for $y$ is not used. Similarly $$x^{11} = \frac{X_2}{a_2} x + \frac{Y_2}{a_2} y$$

where the quantities $X_1, X_2, Y_1, Y_2$ have their appropriate signs.

We are now substituting the above expressions for $x^1$ and $x^{11}$ in terms of $h_0$ into the two equations above $$\frac{X_1}{a_1}x+\frac{Y_1}{a_1}y=\frac{P_1}{a_1}h_0+\frac{a_1}{2}-\frac{P_1^2}{2a_1}$$

$$\frac{X_2}{a_2}x+\frac{Y_2}{a_2}y=\frac{P_2}{a_2}h_0+\frac{a_2}{2}-\frac{P_2^2}{2a_2}$$

giving $$x=\frac{P_1Y_2-P_2Y_1}{X_1Y_2-X_2Y_1}h_0+\frac{a_1^2Y_2-a_2^2Y_1}{2(X_1Y_2-X_2Y_1)}-\frac{P_1^2Y_2-P_2^2Y_1}{2(X_1Y_2-X_2Y_1)}$$

$$y=\frac{X_1P_2-X_2P_1}{X_1Y_2-X_2Y_1}h_0+\frac{a_2^2X_1-a_1^2X_2}{2(X_1Y_2-X_2Y_1)}-\frac{P_2^2X_1-P_1^2X_2}{2(X_1Y_2-X_2Y_1)}$$

where $(X_1, Y_1)$ $(X_2, Y_2)$ are the co-ordinates of the slaves in the desired co-ordinate system, $a_1$, $a_2$ are the baseline lengths and $P_1$ and $P_2$ are the hyperbolic co-ordinates; all of them, with the exception of the baseline lengths, with their appropriate signs. The signs of the baseline lengths are immaterial and are therefore always taken as positive. We thus have $x$ and $y$ in the form:

$$x=Ah_0+B$$
$$y=Ch_0+D$$

where A, B, C, D are known. Using now the relation, $$x^2+y^2=h_0^2$$

a quadratic in $h_0$ is obtained.

Having obtained $h_0$, we substitute into the equations for $x$ and $y$ above to obtain the position.

More generally, if the Cartesian co-ordinate system does not have the master at the origin, instead of using the relationship $x^2+y^2=h_0^2$, a relationship of the form $$(x\pm a)^2+(y\pm b)^2=h_0^2$$

is employed.

It is also possible to proceed by considering a second pair of slaves (one of which may be one of the first pair), and thus arrive at two further expressions for $x$ and $y$ in the form:

$$x=A_2h_0+B_2$$
$$y=C_2h_0+D_2$$

where $A_2$, $B_2$, $C_2$ and $D_2$ have been calculated in precisely the same way as $A_1$, $B_1$, $C_1$ and $D_1$ were except that, instead of using $P_1$, and $P_2$ as in the previous example, we use $P_2$ and $P_3$ say. Similarly using $P_3$ and $P_1$ we can arrive at two other equations:

$$x=A_3h_0+B_3$$
$$y=C_3h_0+D_3$$

From the purely geometrical point of view these three sets of equations will give precisely the same result for $x$ and $y$, and are such that the determinants formed by their respective coefficients are equal to zero, i.e.

$$\begin{vmatrix}1 A_1 B_1\\1 A_2 B_2\\1 A_3 B_3\end{vmatrix}=\begin{vmatrix}1 C_1 D_1\\1 C_2 D_2\\1 C_3 D_3\end{vmatrix}=0$$

In practice, however, due to electromagnetic wave propagation errors and due to fixed system errors, these three sets of equations for $x$ and $y$ will give slightly different results for $x$ and $y$ if the propagation errors from all three slave stations are more or less equal and could give widely different answers for $x$ and $y$ when the propagation errors from one of the slaves is very much greater than those from the other two. However, if in the application envisaged, a high degree of accuracy is not required, or if some system of wave propagation is used which has smaller errors, or if a limitation were imposed on the range at which this device would be used, then the value of $h_0$ can be determined from any two of the pairs of equations for $x$ and $y$ by direct solution not involving a square root, i.e. if we choose:

$$x=A_1h_0+B_1$$
$$y=C_1h_0+B_1$$

and $$x=A_2h_0+B_2$$
$$y=C_2h_0+D_2$$

then we may solve for $h_0$ either from the pair in $x$ or the pair in $y$, thus:

$$h_0=\frac{B_1-B_2}{A_2-A}$$

or $$h_0=\frac{D_1-D_2}{C_2-C_1}$$

and thus determine the values of $x$ and $y$. Any of the various combinations of pairs of equations for $x$ and $y$ and values of $h_0$ obtained therefrom can be used if desired, and criteria for determining which of the various combinations is to be used can be incorporated. It will be seen that the calculations may readily be effected in a digital computor to any required degree of accuracy thereby preserving the positional accuracy of the navigation system though a mechanical analogue, or indeed any other form of analogue device could be made using this principle, if required.

Although a mathematical explanation has been given assuming a rectangular co-ordinate system, a non-rectangular co-ordinate system could be employed if desired.

The following drawings and description set forth the best mode contemplated by the inventor of carrying out his invention. In the description, reference is made to the accompanying drawings in which.

Figure 1:
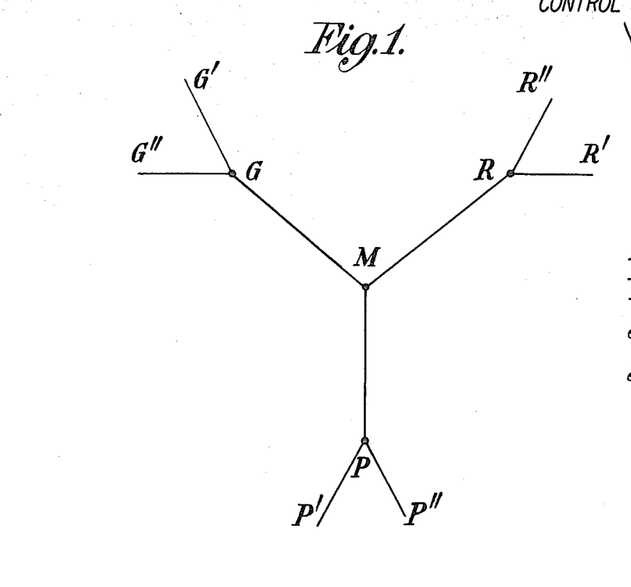
FIG. 1 is a diagrammatic plan view illustrating the position of transmitting stations in a hyperbolic navigation system.

The navigational computing apparatus to be described hereinafter is arranged particularly for use with a hyperbolic navigation system having a master station and three slave stations, which slave stations for convenience are referred to as the red, green and purple slaves. The four transmitting stations are spaced apart and would generally be arranged in a star shaped pattern as shown in FIG. 1 with the master M near the centre of the pattern and the red, green and purple slaves R, G and P disposed around the master. For the purposes of the present invention it may be assumed that these stations transmit continuous radio frequency signals. In the particular embodiment to be described, the master station transmits signals at a frequency $6f$ where $f$ is a fundamental frequency of the system and the red, green and purple slave stations transmit signals at frequencies $8f$, $9f$ and $5f$ respectively. The slave signals are locked in phase to the master signals so that by measurement of the phase relationship at a mobile receiver of signals received from the master and a slave station, a position line through the position of the receiver is determined. The position line is one of a set of confocal hyperbolae having the master and slave stations as foci. By using the master and two slave stations, two intersecting hyperbolic position lines are obtained, thereby defining the location of the receiver. The phase differences which thus determine the location of the receiver are thus referred to as hyperbolic co-ordinates.

Figure 2:
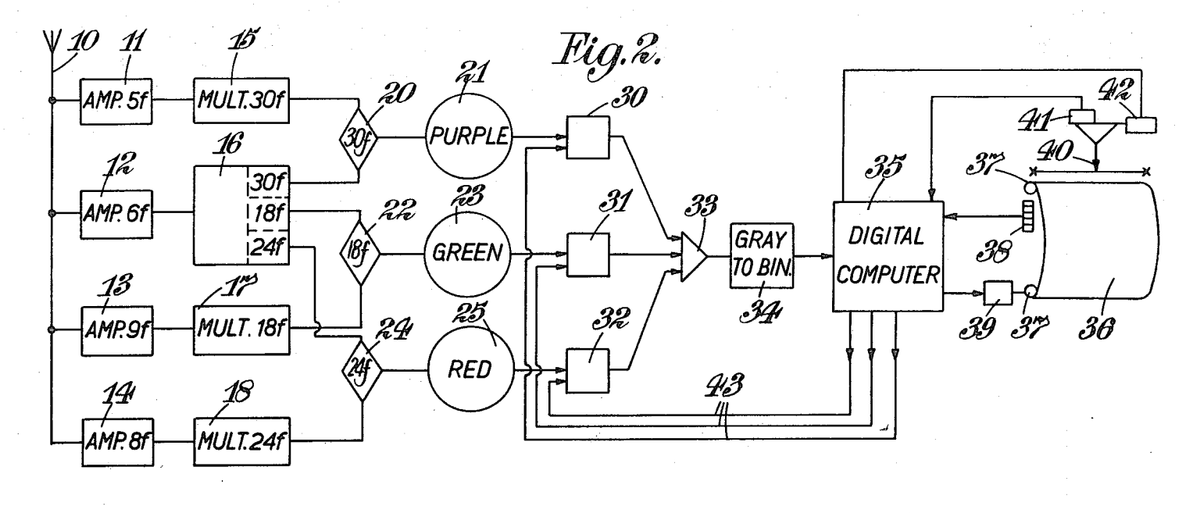
FIG. 2 is a block diagram illustrating equipment to be carried on a vehicle for use with the transmitting stations of FIG. 1.

In a mobile receiver, as shown in FIG. 2, to determine the hyperbolic co-ordinates the signals are picked up by an aerial 10 and are amplified by amplifiers 11 to 14 tuned respectively to the frequencies $5f$, $6f$, $9f$, and $8f$. The outputs of the amplifiers are fed to frequency multipliers 15 to 18. The frequency multiplier 16 associated with the $6f$ signal from the master station separately multiplies the received $6f$ signal by factors of 3, 4 and 5 to provide outputs of $18f$, $24f$ and $30f$. The $30f$ output from the multiplier 16 is fed to one input of a phase discriminator 20 to the other input of which is fed a $30f$ output from the multiplier 15 which multiplies the received purple slave $5f$ signal by a factor of 6. The discriminator 20 provides an output which is representative of the phase relationship between the master and purple slave signals at the receiver. This output is used to drive mechanically a phase indicator and digit discs assembly 21. This phase indicator visually indicates the phase relationship for checking purposes. The digit discs provide a digital output in a ray code representative of the phase relation between the $30f$ outputs from the multipliers 15 and 16, i.e. the master-purple slave hyperbolic co-ordinate. The $18f$ output from the multiplier 16 is fed to one input of a discriminator 22 to the other input of which is fed an $18f$ output from the multiplier 17 which multiplies the received $9f$ green slave signal by a factor of 2. The discriminator 22 drives an indicator and digit discs 23, the digit discs thereby giving an output in digital form in a Gray code representative of the phase difference between the $18f$ signals from the multipliers 16 and 17, i.e. the master-green slave hyperbolic co-ordinate. A $24f$ output from the multiplier 18, which multiplies the frequency of the received red slave signals by a factor of 3, is fed to one input of a discriminator 24 to the other input of which is fed the $24f$ output from the multiplier 16. The discriminator 24 drives an indicator and digit discs 25 to provide an output in digital form in a Gray code representative of the phase difference between the $24f$ signals from the multipliers 16 and 18, i.e. the master-red slave hyperbolic co-ordinate.

A hyperbolic phase comparison navigation system of the above kind is, with the exception of the provision of digit discs, more fully described in the specification U.S. Pat. Ser. No. 2,530,903 and reference may be made to that specification for further explanation of the construction and manner of operation of such a system. The indicators 21, 23 and 25 provide indications with respect to three sets of confocal hyperbolae each set having a master station and the appropriate slave station as the two foci. The present invention is concerned more particularly with the conversion of this information into positional information in Cartesian or polar co-ordinates. The positional information in binary digital form from the indicators and digit discs 21, 23 and 25 is fed through gates 30, 31, 32, which are controlled as hereinafter described to feed only one particular output at a time, and the information from the gates 30, 31, 32 is then fed through an "OR" gate 33 to a Gray to binary information converter 34. The converter 34 gives the hyperbolic positional co-ordinates in binary form and this information is fed into a digital computer 35 for providing outputs in Cartesian or polar co-ordinates. In the particular arrangement illustrated in FIG. 2, the output of the computer 35 is normally in Cartesian co-ordinates, one co-ordinate signal being used to control the movement in one direction of a flight log chart 36 carried on rollers 37, the computer comprising the chart roll position from a position sensing device 38 co-operating with the chart and feeding a correction drive signal to a drive servo 39. The other co-ordinate of the Cartesian co-ordinate output of the digital computer is used to control the position of a pen 40 which is traversed across the width on the chart, the computer comparing the present position of the pen from a position sensing device 41 with the required position and feeding a correcting signal to a drive servo 42. The pen and chart position sensing devices each comprise a number, e.g. 10 or 11, of photo-cells co-operating with markings on a fixed structure for the pen position and on the chart for the chart position, the markings being arranged so that the outputs of the photo-cells represent the position information in digital form in Gray code. The computer 35, by means of output control circuits 43, controls the operation of the aforementioned gates 30, 31 and 32. Chart display devices in which an index is moved in one co-ordinate direction across a chart which is traversed in the other co-ordinate direction are in themselves known and reference may be made for example to U.S. Pat. No. 2,769,977 of G. E. Roberts et al. for a description of one form of chart display driven by an open loop servo drive in accordance with positioned information from a hyperbolic phase comparison radio navigation system. The particular chart display device shown in FIG. 2 is described in further detail in the specification of U.S. Pat. No. 3,113,313 of G. E. Roberts, filed Nov. 9, 1961. The construction of gates such as the gates 30 to 33 and of Gray to binary converters are well known—see for example "Logical Design of Digital Computers" by Montgomery Phister, Jr., published by John Wiley & Son in 1958.

Figure 3:
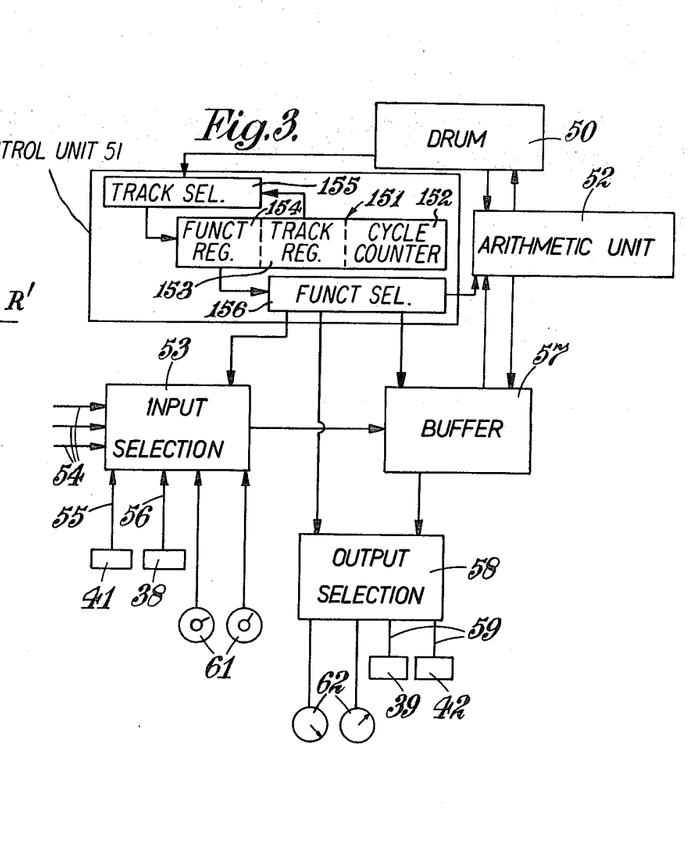
FIG. 3 is a diagram illustrating part of the equipment of FIG. 2 in further detail.

The computer 35 is illustrated in further detail in FIG. 3 and its manner of operation is explained with reference to FIG. 6. It has a magnetic storage drum 50 with a number of tracks on which information can be stored. These tracks include programme tracks defining the programme for carrying out the computation previously described, the programme information being fed to a control unit 51. The drum also has data tracks carrying basic data relating to the pairs of stations which may be employed. In a typical case the computer may have to operate in conjunction with a number of different chains of transmitting stations, each chain having a master and three slave stations and, if there were five such chains, the data tracks on the drum might carry information relating to 15 pairs of stations. These data tracks also carry the universal constants which are common to all the computations. The information from the data tracks is fed as required by the control unit 51 to an arithmetic unit 52. The drum also has a working space track for storage purposes to which information can be fed from the arithmetic unit and returned to the arithmetic unit as required. The drum also carries a clock track for timing purposes and carried tracks forming the delay portions of accumulators, the signals being written onto and read off the carrier tracks by spaced writing and reading heads. The drum may also have a multiplicant track to avoid the necessity of a separate multiplicand register, the multiplicand or divisor being copied on this track a sufficient number of times to perform the multiplication and division routines.

The control unit 51 controls the operation of the computer in accordance with the required programme. The unit 51 consists basically of a shifting register 151 which receives the programme data from the drum, the register being in three parts, namely a cycling counter 152, a track register 153 and a function register 154, the three parts dealing with the appropriate parts of the words from the programme tracks on the drum. The track register and the function register control respectively a track selector 155 for selecting the next track to be used on the drum and a function selector 156 for specifying the particular operation e.g. add or subtract, to be carried out. For this purpose the control unit controls an input selector 53 for selecting input information. The inputs are the digital data coming in parallel form from the digit discs 21, 23 and 25 through input circuits 54. In FIG. 2, a Gray-to-binary converter 34 is illustrated diagrammatically; in practice this conversion is most conveniently effected in the arithmetic unit 52, the input selection unit 53 functioning as the gates 30, 31 and 32 and mixer 33. Input information representative of the position of the pen 40 and chart 36 is fed in on input circuits 55, 56 from photo-cell devices 41 and 38 respectively responsive to the position of the pen and chart. This information is also in Gray code and is converted to a binary code in the arithmetic unit 52. The information from the input selector 53 is fed in parallel form to a buffer 57 which converts the input information from parallel to series form for feeding to the arithmetic unit 52. The buffer 57 serves as a buffer store to accept input signals from the Y photo-cells 38 during automatic chart changing, such signals being virtually equivalent to paper tape inputs not synchronised with the computer operation. The arithmetic unit 52 is an adder-subtractor operating serially to either add or subtract one input from another in accordance with a function instruction. The buffer 57 also serves to convert output information from the arithmetic unit 52 from series to parallel form for feeding out to an output selector 58 which, under the control of the control unit 51, feeds appropriate signals via output circuits 59 to the servo mechanisms 42 and 39 for driving the pen 40 and chart 36. These output signals are the required changes in the pen and chart positions to bring the pen to the required position on the chart corresponding to the computed position of the craft.

The computer functions in three duty cycles. The main cycle carries out the operation of converting the hyperbolic positional information into Cartesian co-ordinates, giving outputs in a form for driving the servo mechanisms 39, 42 for the display. The computer also has a secondary duty cycle which, whenever the chart 36 on the display has to be changed, accepts the constants required for the hyperbolic conversion from the photo-cells 38 co-operating with markings on the top and bottom edges of the charts so that, if the chart roll is set in motion to bring a new chart into position on the display device, the markings passing under the chart photo-cells 38 will automatically provide the necessary conversion constants which during the secondary duty cycle are placed by the computer in the appropriate positions on a data track on the drum 50. The information thus provided on each chart are eleven basic constants for calculation purposes derived for the appropriate slave pair and relating to the base line lengths, the angle between the base lines, and the angle of one base line with respect to the $x$ axis. In addition to these constants for calculation, there is provided a number specifying the appropriate slave pair for controlling the input selection and a number, either $0.\overset{..}{9}9$ or 0, specifying an initial approximation for an iterative process for solving a quadratic equation for $h$ in the event that an approximation is required. Two of the Y photo-cells provide distinctive outputs for identifying the information, e.g. chart position or input data, from the remaining Y photo-cells. The instruction to jump to the secondary duty cycle is a conditional one contained in the main duty cycle. When the secondary duty cycle is complete, control is transferred automatically and unconditionally to the main duty cycle. The computer also has a third cycle, known as the interrupt cycle, in which positioned co-ordinates of a pre-selected point are obtained from manually controlled signal sources 61, which may be interchangeable punched cards or photo-cell systems or digit discs to be set to any required position. These co-ordinates, which are in binary digital form, are accepted by the computer which thereupon determines the bearing and distance of the craft from this pre-set position, providing outputs on indicators e.g. dial indicators 62. The computer does not normally employ the interrupt cycle, it being conditioned to do so by the operator switching the system manually to this cycle. On completion of the interrupt cycle, control is automatically returned to the main duty cycle. Provision is made to prevent the computer from being interrupted during the secondary duty cycle.

The computer effects the hyperbolic to Cartesian co-ordinate conversion using the mathematical process previously described with reference to FIGS. 4 and 5. The phase angle outputs from the radio navigation system are related to the difference of distances P from the craft to the master and slave stations the difference being represented by the expressions $D_i\lambda - a_i$ where $D_i$ is, in cycles, the appropriate phase angle indication, $\lambda$ is the basic chain wave length and $a_i$ is the appropriate master to slave base line distance. The computer thus firstly calculates the values of P for each slave pair. As previously explained, $x$ and $y$ may be expressed as $$x = Ah_0 + B$$
$$y = Ch_0 + D$$

where A, B, C, and D may be obtained from the basic constants referred to above, the chart scale and the values of P obtained from the inputs from the Gray to binary converter representing the hyperbolic co-ordinates. The computer thus next calculates the values of A, B, C and D. Then using the relation $x^2 + y^2 = h_0^2$, a quadratic in $h_0$ is obtained. This quadratic equation ay be written as $$Jh_0^2 + 2Kh_0 + L = 0$$

The process for solving the quadratic equation $$Jh^2 + 2Kh + L = 0$$

is to iterate the equation $$h_1 = \frac{h}{2} - \frac{1}{2} \frac{Kh + L}{Jh + K}$$

where $h^1$ is the new value of $h$. This is a second order convergent process provided the values of $h$ (the required answer) at the initial approximation are both less than unity. If both roots are positive and both less than one, then the initial approximation will be either $0.\overset{..}{9}9$ or zero. If both roots are positive and one of them greater than one, the smaller root, which will be less than one, is required, and the initial approximation must be zero. If one root is negative and one root is positive, the positive root is required. Assuming the craft is within the coverage area of the system, this root will be less than one and the initial approximation will be $0.\overset{..}{9}9$. The initial approximation need only be used for calculation purposes when first entering the coverage area of a transmitting chain and, as previously explained, is part of the data available on the top and bottom edges of each chart. The iterative solution, in the worst case on a chain change might require about six iterations. In all other cases one iteration is generally sufficient and two iterations are ample. The computer in this embodiment is programmed to do two iterations regardless of the initial approximations, and thus, for the worst case of chain changing, the display may not be accurate until the completion of three complete cycles of computation, typically about three seconds.

Having obtained $h$, the values of $x$ and $y$ are obtained from $$x = Ah_0 + B$$
$$y = Ch_0 + D$$

The values of $x$ and $y$ are compared with the pen and chart position to obtain the errors $\Delta x$ and $\Delta y$ which are fed to the buffer store and thence to the servo drives 42 and 39 to correct the position of the pen and chart.

Figure 6:
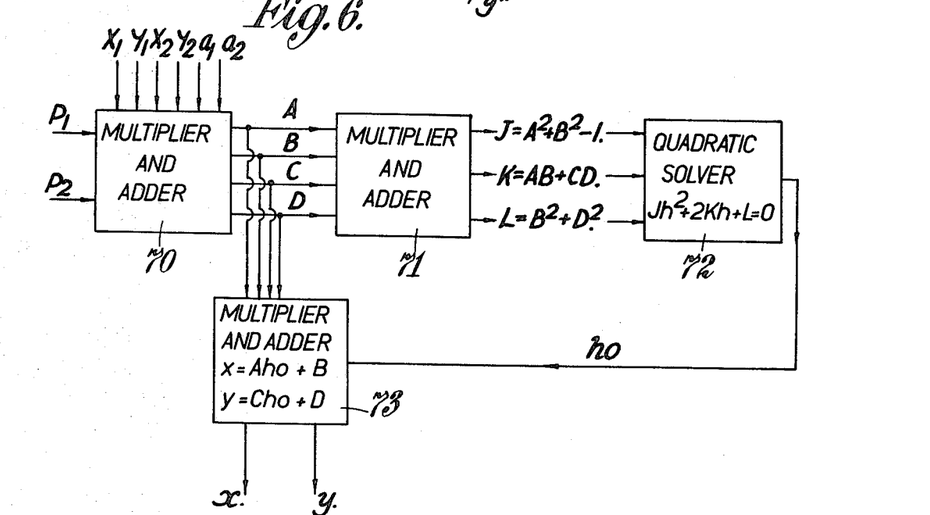
FIG. 6 is a block diagram for explaining the operation of the computing apparatus employed in the equipment of FIG. 2.
Figure 7A:
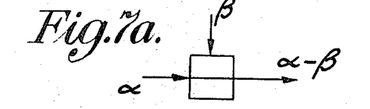
FIGS. 7a–7f are diagrams explaining symbols used in FIGS. 8 to 14.
Figure 7B:
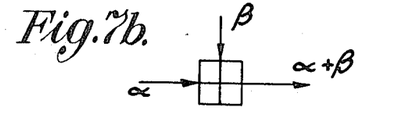
Figure 7C:
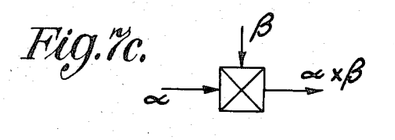
Figure 7D:
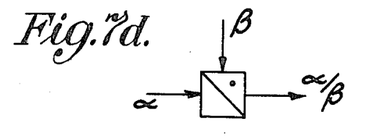
Figure 7E:
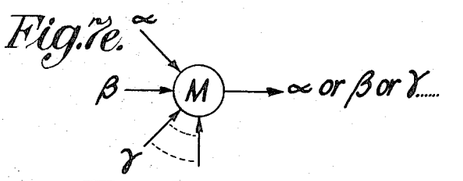
Figure 7F:
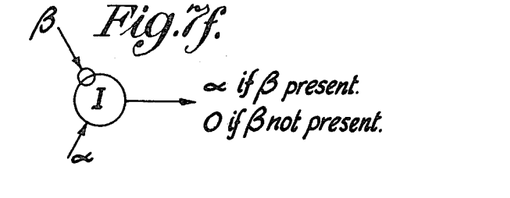

The operation of the computer is illustrated in FIG. 6. The computer 35 may be a general purpose computer programmed to carry out the appropriate mathematical operations or it may be a special purpose computer constructed to carry out the specific mathematical operations. In either case, the manner of operation will be clear from FIG. 6 in which the mathematical operations are shown in block diagram form. The two selected hyperbolic co-ordinates $P_1$ and $P_2$ and combined with the constants $X_1$, $Y_1$, $X_2$, $Y_2$, $a_1$ and $a_2$ from the chart in a multiplier and adder 70 to give the values A, B, C and D as previously defined. By a further multiplying and adding operation indicated by the block 71, the values of J. K and L are found, J being $A^2+C^2-1$, K being $AB+CD$ and L being $B^2+D^2$. These values of J, K and L are the coefficients of a quadratic equation $Jh^2+2Kh+L=0$ which is solved in a quadratic solver 72 to give the value of $h$. This value of $h$ is combined by a further multiplying and adding operation indicated at 73 with the values A, B, C and D to give $x=Ah+B$ and $Y=Ch+D$.

Figures 8, 9, 11:
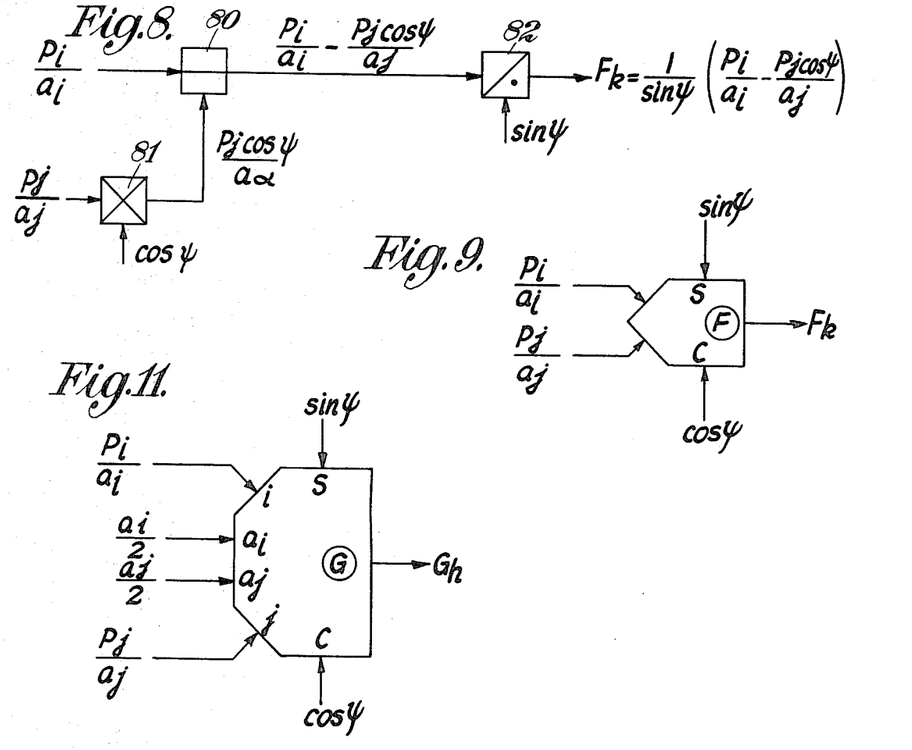
FIGS. 8 to 14 illustrate in further detail the construction of the computer of FIG. 6.
Figure 10:
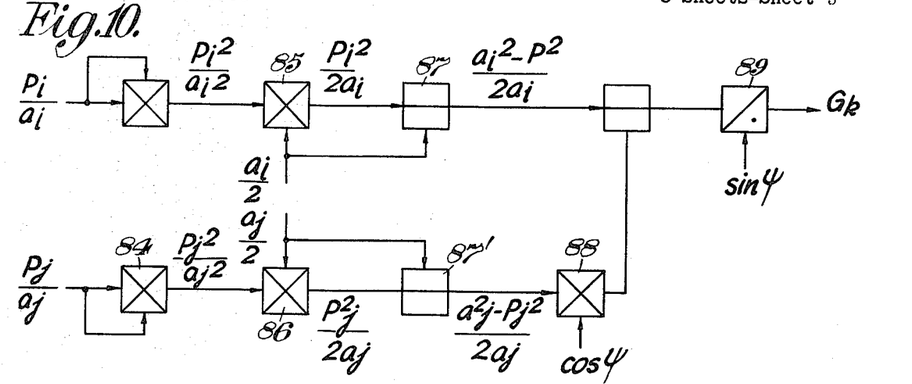
Figure 12:
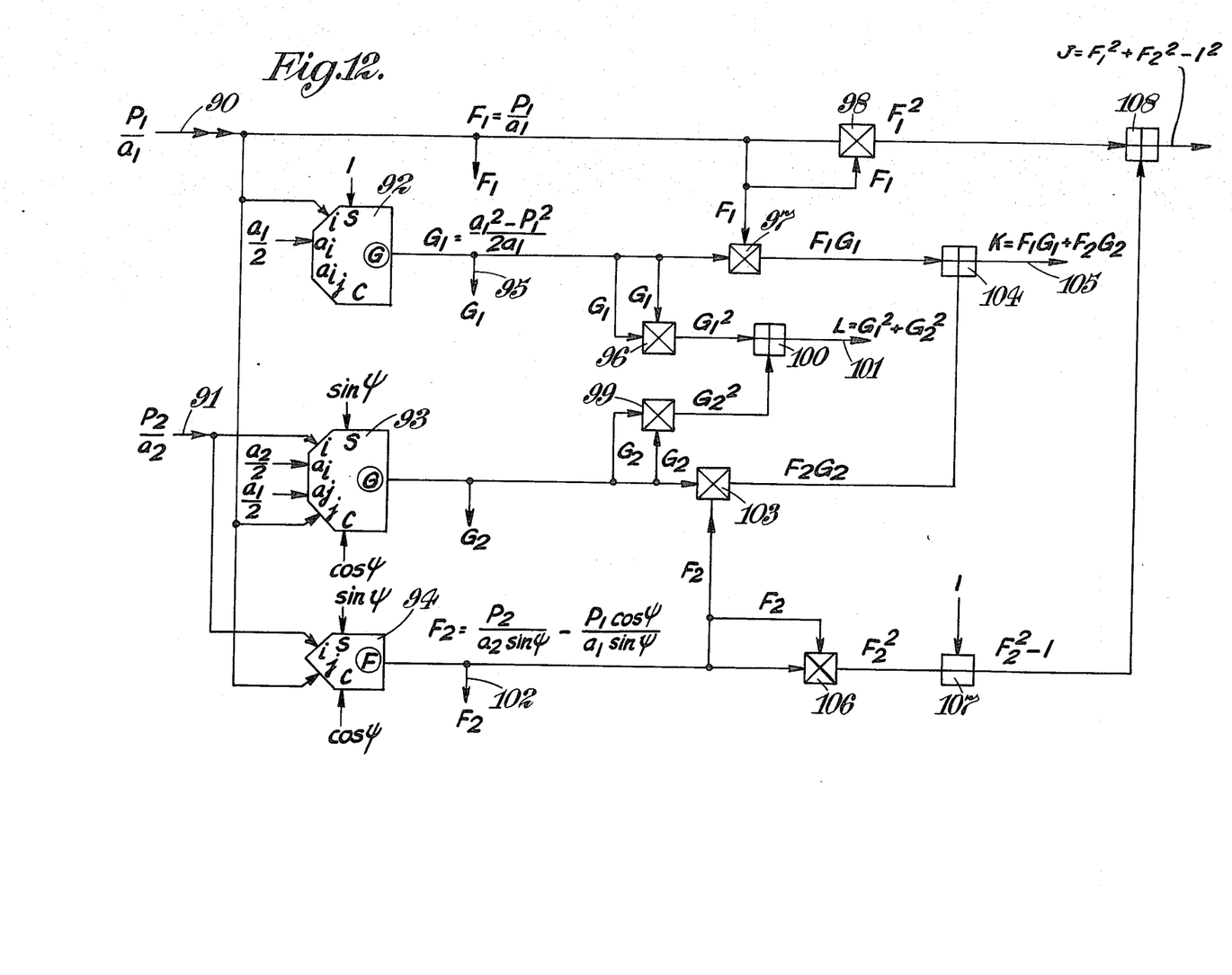

The construction of the computer of FIG. 6 is illustrated in further detail by means of FIGS. 7 to 14. These figures thus illustrate the units of a special purpose computer for carrying out the necessary mathematical computations. However, in FIGS. 7 to 14, the opportunity is taken to give, as an example, a slight modification of the mathematical steps in that instead of feeding in the slave station locations as co-ordinates $X_1$, $Y_1$ and $X_2$, $Y_2$ the positions of these stations are defined in terms of the base line lengths $a_1$ and $a_2$ from the master station and the angle $\psi$ between these base lines. Of these figures, FIG. 7 illustrates a number of symbols from units carrying out the elementary mathematical operations of addition, subtraction, multiplication and division and for "AND" and "OR" gates. FIGS. 8 and 10 illustrate combination of these simple units for preparing specific calculations and FIGS. 9 and 11 show symbols respectively representing the combinations of FIGS. 8 and 10. FIG. 12 is a quadratic equation generator, illustrated diagrammatically using the symbols of FIGS. 7, 9 and 11. The device of FIG. 12 generates the coefficients of the aforementioned quadratic equation $$Jh^2+2Kh+L=0$$

Figure 13:
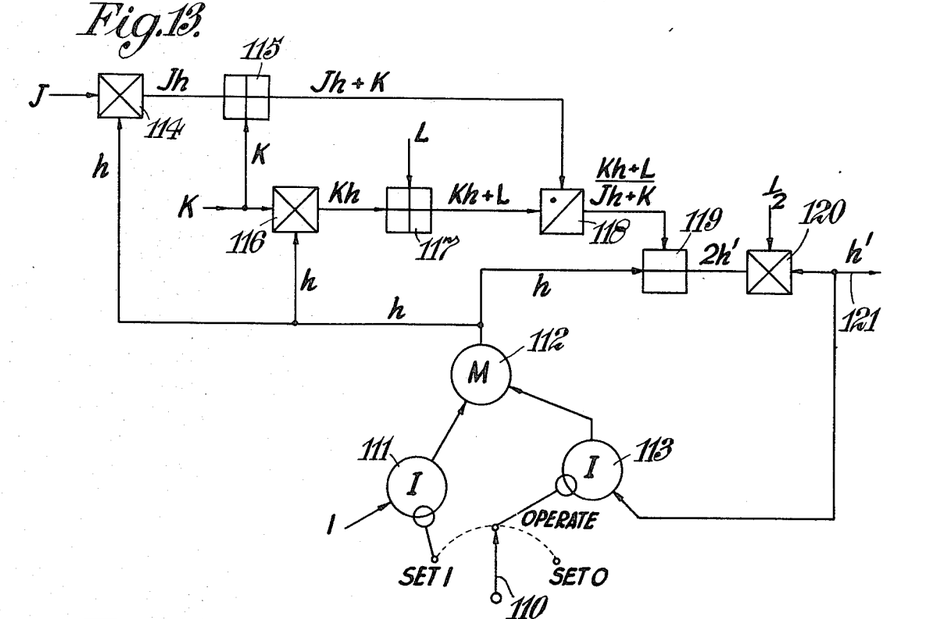
Figure 14:
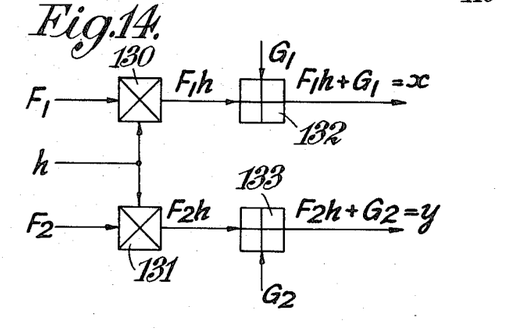

FIG. 12 thus forms the blocks 70 and 71 of FIG. 6. FIG. 13 shows a quadratic solver constructed of the units symbolised in FIG. 7 and forms the block 72 of FIG. 6. FIG. 14 illustrates how the output from the quadratic solver of FIG. 13 is used to obtain positional co-ordinates in Cartesian form in block 73 of FIG. 6.

Referring now to FIG. 7, each of the lines 7a to 7f shows a symbol representing a logical unit with its inputs and also shows the mathematical equivalent. Thus FIG. 7a shows a substracting unit with two inputs $\alpha$ and $\beta$ giving an output $\alpha-\beta$. FIG. 7b shows an adder with inputs $\alpha$ and $\beta$ giving $\alpha+\beta$. FIG. 7c shows a multiplier with inputs $\alpha$ and $\beta$ multiplied by $\beta$. FIG. 7d shows inputs $\alpha$ and $\beta$ to a divider giving $\alpha/\beta$. In each of FIGS. 7a to 7d, the second input is shown at the top but, for convenience in using such symbols later, it may be at the bottom, the meaning of the symbol being unaltered. FIG. 7e shows a gate through which any of the inputs $\alpha$, $\beta$, $\gamma$, etc. can pass. FIG. 7f shows an AND gate through which input $\alpha$ can pass only if $\beta$ is present; otherwise the output is zero. FIG. 8 shows a combination of units, referred to hereinafter as the F generator which produces the function $$F_k=\frac{P_i}{a_i \sin \psi}-\frac{P_j \cos \psi}{a_j \sin \psi}$$

$a_i$ and $a_j$ are generic symbols for the base line lengths $a_1$, $a_2$, etc. $\psi$ is the angle between base lines. It will be seen that the arrangement of FIG. 8 comprises one subtracting unit 80, one multiplying unit 81 and one dividing unit 82. In FIG. 8, an input $P_j/a_j$ is fed to one input of the multiplier 81. To the other input of this multiplier is fed $\cos \psi$. The output of the multiplier 81 is fed to the subtractor 80 where it is subtracted from an input $P_1/a_1$. The result of this subtraction is fed to the divider 82 where it is divided by an input $\sin \psi$ to give the function $F_k$ set out above. FIG. 9 illustrates the function generator of FIG. 8 as a single symbol to be used in FIG. 12. FIG. 10 shows what will hereinafter be referred to as a G generator. This produces the function $$G_k=\frac{a_i^2-P_i^2}{2a_i \sin \psi}-\frac{a_j^2-P_j^2}{2a_j \sin \psi}\cdot \cos \psi$$

It will be seen that this function generator has two multiplying units 83, 84 which each has two identical inputs so as to square that input giving $P_i^2/a_i^2$ and $P_j^2/a_j^2$ respectively. These inputs are further multiplied in multiplying units 85, 86 where they are multiplied respectively by $a_i/2$ and $a_j/2$ and then fed to subtracting units 86, 87. The output from the second of these units 87 is multiplied in a multiplier 88 by $\cos \psi$ and then subtracted from the output of unit 86. The result of this subtraction is divided, in a divider 89, by $\sin \psi$ to give the required output $G_k$. The function generator of FIG. 10 is shown as a single symbol in FIG. 11 and this symbol will be used in FIG. 12. If any input to the symbol of FIG. 11 is omitted, it will be assumed to be zero. If one of the trigonometric inputs $\sin \psi$ or $\cos \psi$ is made zero, the other must necessarily be unity and will be shown as such. An example of a G function generator with the $P_j$ and $a_j$ inputs zero and with $\sin \psi$ equal to unity, $\cos \psi$ being zero, is shown at the top left hand corner of FIG. 12. With these particular inputs and with $a_i$ made $a_1$ and $P_i$ made $P_1$, this G generator guadratic $Jh^2+2Kh+L=0$ $$\frac{a_1^2-P_1^2}{2a_1}$$

Turning now to FIG. 12, there is shown a quadratic equation generator for generating the coefficients of the quadratic $Jh^2+2Kh+L=0$ where $\quad J=F_1^2+F_2^2-1$ $$K=F_1G_1+F_2G_2$$

$$L=G_1^2+G_2^2$$

In FIG. 12, the inputs from the receiver are $P_1/a_1$ on a line 90 and $P_2/a_2$ on line 91. The input $P_1/a_1$ is fed to two G generators 92, 93 and an F generator 94. The input $P_2/a_2$ is fed to the G generator 93 and the F generator 94. The inputs $\sin \psi$ and $\cos \psi$ are applied to the G generator 93 and F generator 94. For the G generator 92, unity is fed into the $\sin \psi$ input and zero to the $\cos \psi$ input. The output from the G generator 92 is $$G_1=\frac{a_1^2-P_1^2}{2a_1}$$

and this is fed out at 95 to the Cartesian converter of FIG. 14. $G_1$ is also fed to a multiplier 96 used as a squarer to give $G_1^2$ and to a multiplier 97 where it is multiplied by $F_1$ to give $F_1G_1$. $F_1$ would be the specific output of an F generator having $P_1/a_1$ as the first input $P_i/a_i$ and having $P_j/a_j$ made zero and $\psi$ made 90°. With these inputs $F_1$ would be $P_1/a_1$ and hence no separate F generator is required to give $F_1$, this $F_1$ being taken direct from lead 90. $F_1$ is also fed a multiplier 98 arranged as a squarer to give $F_1^2$. The G generator 93 gives an output $G_2$ where $$G_2=\frac{a_2^2-P_2^2}{2a_2 \sin \psi}-\frac{a_1^2-P_1^2}{2a_1 \sin \psi}\cdot \cos \psi$$

This output $G_2$ is fed to a multiplier 99 arranged as a squarer to give $G_2^2$ which is combined in an adder 100 with $G_1^2$ from multiplier 97 to give $L=G_1^2+G_2^2$. This output L on line 101 is used in the quadratic solver of FIG. 13. The F generator 94 gives an output $$F_2=\frac{P_2}{a_2 \sin \psi}-\frac{P_1 \cos \psi}{a_1 \sin \psi}$$

which is fed out on line 102 for use in the Cartesian converter of FIG. 14. $F_2$ is also fed to a multiplier 103 where it is multiplied by the $G_2$ output from G generator 93 to give $F_2G_2$ which is added in adder 104 to $F_1G_1$ from multiplier 97. This adder gives an output on line 104 of $K=F_1G_1+F_2G_2$ which is used in the quadratic solver of FIG. 13. The output $F_2$ from the F generator 94 is also fed to a multiplier 105 arranged as a squarer to give $F_2^2$ which is fed to a subtracting unit 106 having a second input of unity to give $F_2^2-1$ which is fed to an adder 107 where it is added to $F_1^2$ from the multiplier 98 to give, on line 108, an output $$J = F_1^2 + F_2^2 - 1$$

which is used in the quadratic solver of FIG. 13.

Referring now to FIG. 13, there is shown the quadratic solver which solves the quadratic equation $$Jh^2 + 2Kh + L = 0$$

by the iteration process $$h^1 = \frac{h}{2} - \frac{1}{2}\frac{Kh+L}{Jh+K}$$

This converges very quickly once it is anywhere near its right value. As previously explained, it needs an initial setting (once only on first switching on the apparatus) for determining which root to choose. This initial setting is discussed later but briefly it is set to unity (more strictly to 0.99) if the range from the master station, on first switching on, is greater than ½ $a_m$ where $a_m$ is the longest of the two base lines of the system being employed. It is set to zero if the range is less than $a_m$. There is an intermediate area between ½ $a_m$ and $a_m$ where it is immaterial to which position the switch is set. This switch is shown at 110 in FIG. 13 and has a left hand position, marked "set 1," in which an input is fed to an AND gate 111 so that a second input of unity can be fed through this gate to an OR gate 112. In its right hand position, marked "set 0," the first input is moved from gate 111 so that nothing passes through the gate 111 to gate 112. Once the switch 110 has been set to start the quadratic solver in operation, it can be released to an "operate" position and need not be reset again, even when covering the boundaries of the areas defined above. This is done automatically by the chart constants taken from the chart strip. In the "operate" position, the switch provides an input to open an AND gate 113 so that the output $h^1$ of the quadratic solver is fed through gate 113 and thence to gate 112.

When the quadratic solver is in operation, it causes the value of $h^1$ to be brought to the value of $h$ giving the solution of the quadratic equation $Jh^2 + 2Kh + L = 0$. It is convenient to refer to the output from the gate 112 as $h$, although it will be borne in mind that this is initially either zero or unity. This output $h$ from gate 112 is fed to a multiplier 114 where it is multiplied by J (from line 108 of FIG. 12) to give $Jh$ which is added to K (from line 104 of FIG. 12) to give $Jh+K$ in an adder 115. The input K is also multiplied by $h$ (from the gate 112) in a multiplier 116 to give $Kh$ which is added to L (from line 101 of FIG. 12) to give $Kh+L$ in an adder 117. In a divider 118 the value of $Kh+L$ for adder 117 is divided by $Jh+K$ from adder 115 to $$\frac{Jh+K}{Kh+L}$$

which is subtracted in subtracting unit 119, from $h$ (obtained from gate 112). This output is $2h^1$ which is multiplied by one half in a multiplier 120 to give the required $h^1$ output for gate 113. This $h^1$ output is also fed out on line 121 to be used in the Cartesian converter of FIG. 14. As previously explained $h^1$ rapidly converges to $h$ and it will be assumed that $h$, the solution of $Jh^2+2Kh+L=0$, is fed to the Cartesian converter.

The Cartesian converter of FIG. 14 consists of two multipliers 130, 131 and two adders 132, 133. In multiplier 130, the value of $h$ from line 120 of FIG. 13 is multiplied by $F_1$, obtained from the input line on lead 90 of FIG. 12 to give $F_1h$. This is added in adder 132 to $G_1$ from line 95 of FIG. 12 to $F_1h+G_1$ which is the $x$ output. Similarly the $y$ output is obtained from adder 133 which adds $G_2$ (from G generator 93 of FIG. 12) to $F_2h$ obtained by multiplying in multiplier 131, the value of $h$ (from line 120 of FIG. 13) by $F_2$ from line 102 of FIG. 12.

It will thus be seen that the quadratic equation solver of FIG. 13 constitutes the unit 72 of FIG. 6. FIG. 12 constitutes the units 70, 71 of FIG. 6 and FIG. 14 constitutes the unit 73. In FIGS. 7 to 14, however, the values of $a_1a_2$ and $\psi$ have been used instead of $X_1Y_1$ and $X_2Y_2$ to define the slave station locations and Cartesian coordinate systems has been chosen with the $x$ axis along one base line. It is a simple operation to convert coordinates $xy$ in a Cartesian system to co-ordinates $x^1y^1$ in another Cartesian system with axes at an angle $\theta$ to that of the first system since $x^1 = x \cos \theta + y \sin \theta$ and $y^1 = y \cos \theta - x \sin \theta$. It will be immediately apparent that $F_1$ $G_1$ $F_2$ and $G_2$ are the exact equivalents of A, B, C and D when this co-ordinate system is chosen for defining the values of $X_1$ $Y_1$ and $X_2$ $Y_2$. The expressions A, B, C and D are thus slightly more generalised versions of $F_1$ $G_1$ $F_2$ and $G_2$ in which the direction of the X axis of the co-ordinate system can be arbitrary. A, B, C and D later $F_1$ $G_1$ $F_2$ and $G_2$ are obtained by the simple operations of addition, subtraction, multiplication and division; the invention thus includes within its scope the computations using arbitrary axes and employing A, B, C and D as well as the special case where the $x$ axis passes through one of the slave stations and where A, B, C and D reduce to $F_1$, $G_1$, $F_2$ and $G_2$.

It will be seen that the computer normally only uses information from two slave stations and the master station. The choice of which pairs of stations to use depends on a number of factors but the boundaries between the regions in which different pairs are chosen are not critical. FIG. 1 illustrates the regions employed in the particular computer described above. Referring to FIG. 1 of the drawings it will be seen that lines MG, MR and MP have been drawn representing the base lines between the master station and the green, red and purple slaves respectively. From the green slave G two lines GG¹ and GG¹¹ are drawn radially outwardly as extensions of the lines RG and PG. Similarly from the red slave R two lines RR¹ and RR¹¹ are drawn outwardly as extensions of the lines GR and PR and from the purple slave P two lines PP¹ and PP¹¹ are drawn outwardly as extensions of the line RP and GP. Within the region bounded by the lines G¹GMRR¹¹ the navigation system would be used employing the master station with the green and red slave stations. These master and green and red slave stations are also used within the region included within the lines PP¹ and PP¹¹. Similarly the master station with the green and purple slaves would be employed in the region defined by the lines G¹¹GMPP¹ and in the sector between the lines RR¹ and RR¹¹. The master with the red and purple slave stations would be used within the region R¹RMPP¹¹ and between the lines GG¹ and GG¹¹. The choice of pairs of stations is controlled by the data recorded along the top and bottom edges of each chart, this data defining the pairs to be employed in the coverage region of the chart. It will be understood that although two particular pairs of stations might be the optimum choice in any particular location, the use of a different choice of stations does not lead to an incorrect result but may merely give some decrease in accuracy. At the boundaries of the regions defined above the choice of pairs is in no way critical.

It has been mentioned above that, on first using the equipment or on changing from one chain to another, it may be necessary to select either 0.99 or zero as an initial approximation. The particular choice of 0.99 or zero depends on the position of the craft and the layout of the transmitting stations and may readily be determined mathematically for any particular set of circumstances. It may briefly be stated, however, that, it can be shown that a sufficient (but not necessary condition to arrive at a correct solution is for the initial approximation to be zero inside a certain area around the master station and 0.99 outside this area. The area, for the usual case where the angles RMG, GMP and PMR are all greater than 90° is the circumcircle of the midpoints of the base lines MG, MR and MP. If one of the angles between the base lines is axactly 90° and the other two are greater than 90°, the area is defined by a straight line between the midpoints of the two base lines which are at 90° together with an arc of the circumcircle through the three midpoints. If one of the angles between the base lines is less than 90° and the other two are greater than 90° the boundary of the region is defined by an inwardly curved arc of a circle between the midpoints of the base lines which are at less than 90° together with an arc of the circumcircle through the three midpoints. If two of the angles between the base lines are exactly 90° and the third angle is 180°, the area is defined by four straight lines forming a four-sided figure with three of its corners at the midpoints of the base lines. The appropriate initial approximation is determined from the data at the top and bottom edges of the chart. It will be understood that this approximation is required only if starting up the equipment or changing to a new chain. At all other times, the previously determined value of $h$ provides a far better approximation and is therefore used.

It will be seen that the mathematical computation described above for converting hyperbolic into Cartesian co-ordinates can readily be performed by a small serial digital computer whilst still preserving the accuracy of the radio navigation system.

I claim:

1. Navigational apparatus for use in a mobile craft with a hyperbolic navigation system of the kind having a common master station with two or more slave stations comprising in combination
   (a) a receiver for a hyperbolic radio navigation system providing outputs representative of the position of the craft in hyperbolic co-ordinates,
   (b) digitizing means coupled to said receiver to convert said outputs into a binary coded form,
   (c) digital data storage means storing non-varying information in a binary coded form defining the co-ordinate positions of the transmitting stations of said radio navigation system and their spacing, and
   (d) digital computing means responsive to the outputs from said digitizing means and said digital data storage means determining coefficients A, B, C and D such that the cartesian co-ordinates of the craft can be expressed by the relationships $Ah_0+B$ and $Ch_0+D$ respectively where $h_0$ is the distance of the craft from the master station and where A, B, C and D are functions only of the hyperbolic co-ordinates and of the positions of the slave stations with respect to the master station, said digital computing means solving said equations by using the inherent relationship, $h_0{}^2=x^2+y_2$ between $h_0$ and the Cartesian co-ordinates $x$ and $y$.

2. Navigational computing apparatus as claimed in claim 1 further comprising closed loop servo means for driving automatic chart position indicating apparatus in accordance with the output of said computing means.

3. Navigational apparatus for use in a mobile craft with a hyperbolic navigation system of the kind having a common master station with two or more slave stations comprising in combination
   (a) a receiver for a hyperbolic radio navigation system providing outputs representative of the position of the craft in hyperbolic co-ordinates,
   (b) digitizing means coupled to said receiver to convert said outputs into a binary coded form,
   (c) digital data storage means storing non-varying information in a binary coded form defining the co-ordinate positions of the transmitting stations of said radio navigation system and their spacing, and
   (d) digital computing means responsive to the outputs from said digitizing means and said digital data storage means determining four coefficients A, B, C and D where $$A=\frac{P_1Y_2-P_2Y_1}{X_1Y_2-X_2Y_1}$$

$$B=\frac{a_1{}^2Y_2-a_2{}^2Y_1}{2(X_1Y_2-X_2Y_1)}-\frac{P_1{}^2Y_2-P_2{}^2Y_1}{2(X_1Y_2-X_2Y_1)}$$

$$C=\frac{P_2X_1-P_1X_2}{X_1Y_2-X_2Y_1}$$

$$D=\frac{a_2{}^2X_1-a_1{}^2X_2}{2(X_1Y_2-X_2Y_1)}-\frac{P_2{}^2X_1-P_1{}^2X_2}{2(X_1Y_2-X_2Y_1)}$$

$P_1$ and $P_2$ being the hyperbolic co-ordinates expressed as differences of distances from the craft to the respective slave stations, $(X_1Y_1)$ and $(X_2Y_2)$ being the co-ordinates of the slave stations in the rectangular co-ordinate system having the master station at the origin, and $a_1$ and $a_2$ being the base line length from the master station to the points $(X_1Y_1)$ and $(X_2Y_2)$ respectively, said digital computing means further comprising means for solving the linear equations $$x=Ah_0+B$$
$$y=Ch_0+D$$

where $x$ and $y$ are the Cartesian co-ordinates of the position of the craft and $h_0$ is the distance of the craft from the master station, using the inherent relationship $x^2+y^2=h_0{}^2$.

4. Navigational apparatus for use in a mobile craft with a hyperbolic navigation system of the kind having a common master station with two or more slave stations comprising in combination
   (a) a receiver for a hyperbolic radio navigation system providing outputs representative of the position of the craft in hyperbolic coordinates,
   (b) digitizing means coupled to said receiver to convert said outputs into a binary coded form,
   (c) digital data storage means storing non-varying information in a binary coded form defining the co-ordinate positions of the transmitting stations of said radio navigation system and their spacing, and
   (d) digital computing means responsive to the outputs from said digitizing means and said digital data storage means determining for coefficients A, B, C and D where $$A=\frac{P_1Y_2-P_2Y_1}{X_1Y_2-X_2Y_1}$$

$$B=\frac{a_1{}^2Y_2-a_2{}^2Y_1}{2(X_1Y_2-X_2Y_1)}-\frac{P_1{}^2Y_2-P_2{}^2Y_1}{2(X_1Y_2-X_2Y_1)}$$

$$C=\frac{P_2X_1-P_1X_2}{X_1Y_2-X_2Y_1}$$

$$D=\frac{a_2{}^2X_1-a_1{}^2X_2}{2(X_1Y_2-X_2Y_1)}-\frac{P_2{}^2X_1-P_1{}^2X_2}{2(X_1Y_2-X_2Y_1)}$$

$P_1$ and $P_2$ being the hyperbolic co-ordinates expressed as differences of distances from the craft to the respective slave stations, $(X_1Y_1)$ and $(X_2Y_2)$ being the co-ordinates of the slave stations in the rectangular co-ordinate system having the master station at the origin, and $a_1$ and $a_2$ being the base line length from the master station to the points $(X_1Y_1)$ and $(X_2Y_2)$ respectively.

(d$_1$) said digital computing means further calculating the coefficients J, K and L where $$J=A^2+C^2-1$$
$$K=AB+CD$$
$$L=B^2+D^2$$

($d_2$) said digital computing means further including a quadratic solver solving the quadratic equation $$Jh_0^2 + 2Kh_0 + L = 0$$

to determine $h_0$, and
($d_3$) said digital computing means further using the determined values of $h_0$ A, B, C and D to determine $x$ and $y$ from the relatitonships $$x = Ah_0 + B$$
$$y = Ch_0 + D$$

5. The combination in an aircraft of
(a) a receiver for a hyperbolic radio navigation system providing outputs representative of the position of the aircraft in hyperbolic co-ordinates,
(b) digitizing means coupled to said receiver to convert said outputs into a binary coded form,
(c) digital data storage means storing non-varying information in binary coded form defining the hyperbolic co-ordinate patterns,
(d) digital computing means coupled to said digitizing means and said digital data storage means determining the values of $$A = \frac{P_1 Y_2 - P_2 Y_1}{X_1 Y_2 - X_2 Y_1}$$

$$B = \frac{a_1^2 Y_2 - a_2^2 Y_1}{2(X_1 Y_2 - X_2 Y_1)} - \frac{P_1^2 Y_2 - P_2^2 Y_1}{2(X_1 Y_2 - X_2 Y_1)}$$

$$C = \frac{P_2 X_1 - P_1 X_2}{X_1 Y_2 - X_2 Y_1}$$

$$D = \frac{a_2^2 X_1 - a_1^2 X_2}{2(X_1 Y_2 - X_2 Y_1)} - \frac{P_2 X_1 - P_1^2 X_2}{2(X_1 Y_2 - X_2 Y_1)}$$

$P_1$ and $P_2$ being the hyperbolic co-ordinates expressed as differences of distances from the craft to the respective slave stations, $(X_1 Y_1)$ and $(X_2 Y_2)$ being the co-ordinates of the slave stations in the rectangular co-ordinate system having the master station at the origin, and $a_1$ and $a_2$ being the base line length from the master station to the points $(X_1 Y_1)$ and $(X_2 Y_2)$ respectively,
(e) said computing means further determining $x$ and $y$, the Cartesian co-ordinate of the position of the craft from the linear equations $$x = Ah_0 + B$$
$$y = Ch_0 + D$$

where $h_0$ is the distance of the craft from the master station, using the relationship $x^2 + y^2 = h_0^2$ to obtain a quadratic in $h_0$ from which $h_0$ is determined and further to compute the values of $x$ and $y$ from the determined values of $h_0$ and the determined values of the coefficients A, B, C and D,
(f) automatic chart position indicating apparatus having an indicator movable relative to a chart in two orthogonal co-ordinate directions, and
(g) servo means driving said automatic chart position indicating apparatus in accordance with the $x$ and $y$ outputs of said computing means to effect movement of said indicator relative to the chart so as to maintain the indicator in a chart position corresponding to the position represented by the hyperbolic co-ordinate output of said receiver.

6. Navigational apparatus for use in a mobile craft with a hyperbolic navigation system of the kind having a common master station with two or more slave stations comprising in combination (a) a receiver for a hyperbolic radio navigation system providing outputs representative of the position of the craft in hyperbolic co-ordinates,
(b) digitizing means coupled to said receiver to convert said outputs into a binary coded form,
(c) digital data storage means storing non-varying information in a binary coded form defining the co-ordinate positions of the transmitting stations of said ratio navigation system and their spacing, and
(d) digital computing means responsive to the outputs from said digitizing means and said digital data storage means determining four coefficients $F_1 G_1 F_2$ and $G_2$ where $$F_1 = \frac{P_1}{a_1}$$

$$G_1 = \frac{a_1^2 - P_1^2}{2a_1}$$

$$F_2 = \frac{P_2}{a_2 - \sin \psi} - \frac{P_1 \cos \psi}{a_1 \sin \psi}$$

$$G = \frac{a_2^2 - P_2^2}{2a_2 \sin \psi} - \frac{a_1^2 - P_1^2}{2a_1 \sin \psi} \cdot \cos \psi$$

$P_1$ and $P_2$ being the hyperbolic co-ordinates expressed as differences of distances from the craft to the respective slave stations, $a_1$ and $a_2$ being the base line length from the master station to the positions of the two slave stations respectively, and $\psi$ being the angle between these two base lines, said digital computing means further solving the linear equations $$x = F_1 h + G_1$$
$$y = F_2 h + G_2$$

where $x$ and $y$ are the Cartesian co-ordinates of the position of the craft in a Cartesian co-ordinate system having the $x$ axis along one of said base lines and $h$ is the distance of the craft from the master station, using the inherent relationship $x^2 + y^2 = h^2$.

7. Navigational apparatus for use in a mobile craft with a hyperbolic navigation system of the kind having a common master station with two or more slave stations comprising in combination
(a) a receiver for a hyperbolic radio navigation system providing outputs representative of the position of the craft in hyperbolic co-ordinates;
(b) digitizing means coupled to said receiver to convert said outputs into a binary coded form,
(c) digital data storage means storing non-varying information in a binary coded form defining the co-ordinate positions of the transmitting stations of said radio navigation system and their spacing, and
(d) digital computing means responsive to the outputs from said digitizing means and said digital data storage means determining four coefficients, $F_1$, $G_1$, $F_2$ and $G_2$ where $$F_1 = \frac{P_1}{a_1}$$

$$G_1 = \frac{a_1^2 - P_1^2}{2a_1}$$

$$F_2 = \frac{P_2}{a_2 \sin \psi} - \frac{P_1 \cos \psi}{a_1 \sin \psi}$$

$$G_2 = \frac{a_2^2 - P_2^2}{2a_2 \sin \psi} - \frac{a_1^2 - P_1^2}{2a_1 \sin \psi} \cdot \cos \psi$$

$P_1$ and $P_2$ being the hyperbolic co-ordinates expressed as differences of distances from the craft to the respective slave stations, $a_1$ and $a_2$ being the base line length from the master station to the positions of the two slave stations respectively, and $\psi$ being the angle between the two base lines, ($d_1$) said digital computing means further calculating the coefficients J, K and L where $$J = F_1^2 + F_2^2 - 1$$
$$K = F_1 G_1 + F_2 G_2$$
$$L = G_1^2 + G_2^2$$

(d₂) said digital computing means further including a quadratic solver solving the quadratic equation $$Jh^2 + 2Kh + L = 0$$

to determine $h$, and (d₃) said digital computing means further using the determined values of $h$, $F_1$, $G_1$, $F_2$ and $G_2$ to determine $x$ and $y$ from the relationships.

$$x = F_1 h + G_1$$
$$y = F_2 h + G_2$$

where $x$ and $y$ are the Cartesian co-ordinates of the position of the craft in a co-ordinate system having the $x$ axis along one of said base lines.

References Cited

UNITED STATES PATENTS

| | | | |
|---|---|---|---|
| 2,582,588 | 1/1952 | Fennessy et al. | 343—105 X |
| 2,769,977 | 11/1956 | Roberts et al. | 343—112 |
| 2,945,223 | 7/1960 | Easy | 343—105 X |
| 3,113,313 | 12/1960 | Roberts | 343—105 |
| 2,945,956 | 7/1960 | Frank | 343—112 X |

EUGENE G. BOTZ, Primary Examiner

F. D. GRUBER, Assistant Examiner

U.S. Cl. X.R.

235—156, 197; 343—105